Patented July 30, 1940

2,209,314

UNITED STATES PATENT OFFICE 2,209,314

PROCESS OF PREPARING AMMONIUM MANDELATE

Joseph S. Baker, Arlington, N. J., assignor to E. R. Squibb & Sons, New York, N. Y., a corporation of New York No Drawing. Application October 20, 1937, Serial No. 170,041

2 Claims. (Cl. 260—521)

This invention relates to the preparation of ammonium mandelate, particularly a product suitable for pharmaceutical use.

Since ammonium mandelate is extremely hygroscopic, the usual prior processes of preparing it have been characterized by the avoidance of aqueous reaction media. For example, ammonium madelate has been prepared by dissolving mandelic acid in ether, introducing anhydrous ammonia, and separating the salt from the solvent. Such processes, however, are unsatisfactory, since it is extremely difficult to remove the organic solvent as completely as required when the product is intended for pharmaceutical use, and since the use of organic solvents like ether on an industrial scale is necessarily hazardous.

It is the object of this invention to provide a simple, economical, and safe process for preparing ammonium mandelate suitable for pharmaceutical use.

In the practice of this invention, ammonium mandelate is prepared by interacting ammonia and mandelic acid in water, and drying the solution of the salt under reduced pressure. Preferably, the drying is conducted at an intermediate stage under an ammonia atmosphere, to prevent decomposition of the product and loss of ammonia therefrom.

The following example is illustrative of the invention:

Strong ammonia water (about 20% in excess of the theoretical quantity) is added to a suitable reaction vessel containing mandelic acid and clean ice (about half the weight of the acid). During the addition, the mass is agitated and the temperature not allowed to exceed 40° C. About two hours after completion of the reaction, the clear solution is siphoned off; the solution is transferred into enameled pans, and vacuum-dried at about 110° F. To avoid spattering while the material is still liquid, the pressure in the drier is not permitted to fall below 1.5 inches mercury, air being admitted when necessary; the addition of air is discontinued as soon as crystallization of the ammonium mandelate begins. The solution is kept quietly boiling by gradually raising the temperature to 140° F. When the dripping in the condenser has slowed to about 20 drops per minute, the vacuum is released, and the salt loosened in the pans. About an hour before the batch would be completely dry, a slow stream of anhydrous ammonia gas is admitted for about fifteen minutes, and the drying resumed for about an hour. When the salt is dry, it is removed, preferably in a dehumidified room, and packaged promptly in moisture-excluding containers.

The introduction of ammonia during the drying serves the additional purpose of accelerating the drying, probably by lowering the boiling point and by sweeping out the water vapor formed. The use of a large excess of ammonia for the reaction serves to protect the product from the adverse effects of atmospheric oxygen, such as darkening of the product, and gives a more rapidly drying and otherwise more desirable product.

The invention may be variously otherwise embodied, within the scope of the appended claims.

I claim:

1. The process of preparing ammonium mandelate which comprises treating mandelic acid with about 20% excess of strong ammonia water, and drying the ammonium mandelate formed by heating under reduced pressure.

2. The process of preparing ammonium mandelate which comprises treating mandelic acid with about 20% excess of strong ammonia water at a temperature not exceeding about 40° C., partially drying the product by heating under reduced pressure, contacting the partially dried product with anhydrous ammonia gas, and completing the drying.

JOSEPH S. BAKER.